US012577422B2

(12) United States Patent
Funakoshi

(10) Patent No.: US 12,577,422 B2
(45) Date of Patent: Mar. 17, 2026

(54) INKJET INK SET, INKJET RECORDING APPARATUS, AND INKJET RECORDING METHOD

(71) Applicant: KYOCERA Document Solutions Inc., Osaka (JP)

(72) Inventor: Daichi Funakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 163 days.

(21) Appl. No.: 18/409,737

(22) Filed: Jan. 10, 2024

(65) Prior Publication Data

US 2024/0228811 A1     Jul. 11, 2024

(30) Foreign Application Priority Data

Jan. 11, 2023     (JP) ................................. 2023-002039

(51) Int. Cl.

| | |
|---|---|
| *C09D 11/40* | (2014.01) |
| *B41J 2/21* | (2006.01) |
| *B41M 3/00* | (2006.01) |
| *B41M 5/00* | (2006.01) |
| *C09D 11/102* | (2014.01) |
| *C09D 11/30* | (2014.01) |
| *C09D 11/322* | (2014.01) |
| *C09D 11/38* | (2014.01) |

(52) U.S. Cl.
CPC ............. *C09D 11/40* (2013.01); *B41J 2/2107* (2013.01); *B41J 2/2117* (2013.01); *B41M 3/008* (2013.01); *B41M 5/0023* (2013.01); *B41M 5/0047* (2013.01); *C09D 11/102*

(2013.01); *C09D 11/30* (2013.01); *C09D 11/322* (2013.01); *C09D 11/38* (2013.01)

(58) Field of Classification Search
CPC ..... C09D 11/40; C09D 11/102; C09D 11/322; C09D 11/38; C09D 11/30; B41M 3/008; B41M 5/0023; B41M 5/0047; B41J 2/2107; B41J 2/2117
See application file for complete search history.

(56) References Cited

U.S. PATENT DOCUMENTS

| | | | |
|---|---|---|---|
| 2020/0023648 A1* | 1/2020 | Gotou ...................... | B41J 2/145 |
| 2024/0228810 A1* | 7/2024 | Funakoshi ........... | C09D 11/102 |

FOREIGN PATENT DOCUMENTS

JP     2013-082885  A     5/2013

* cited by examiner

*Primary Examiner* — Yaovi M Ameh
(74) *Attorney, Agent, or Firm* — Studebaker Brackett PLLC

(57) ABSTRACT

An inkjet ink set includes a first ink and a second ink. The first ink contains a first pigment, a first binder, and a first aqueous medium. The second ink contains a second pigment, a second binder, and a second aqueous medium. The first binder has a Young's modulus of at least 600 N/mm$^2$ and no greater than 1600 N/mm$^2$. The second binder has a Young's modulus of at least 350 N/mm$^2$ and no greater than 1600 N/mm$^2$.

9 Claims, 1 Drawing Sheet

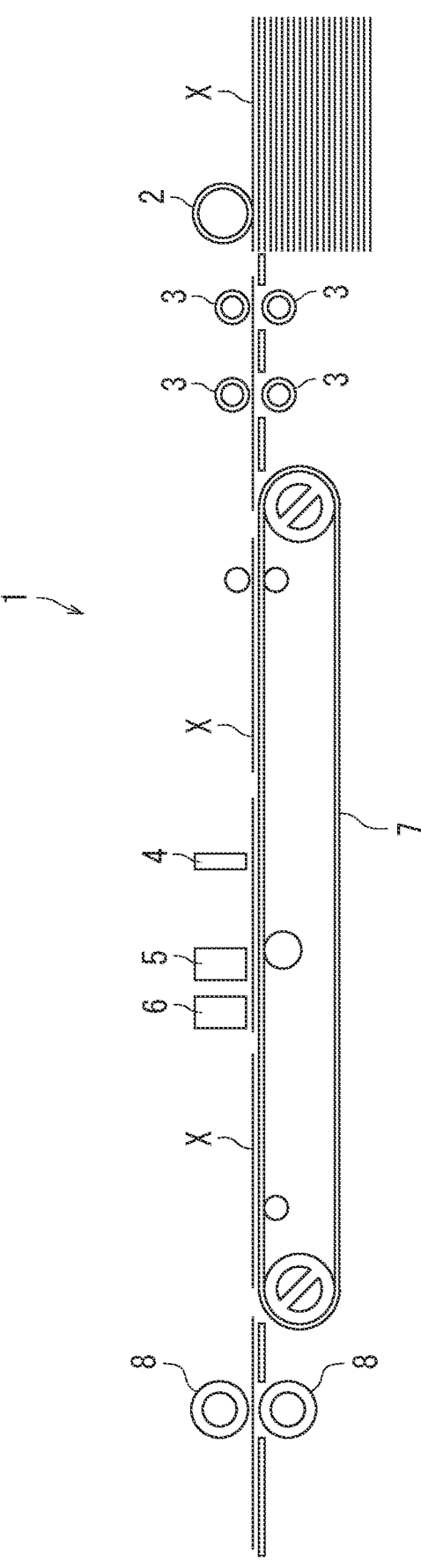

INKJET INK SET, INKJET RECORDING APPARATUS, AND INKJET RECORDING METHOD

INCORPORATION BY REFERENCE

The present application claims priority under 35 U.S.C. § 119 to Japanese Patent Application No. 2023-002039, filed on Jan. 11, 2023. The contents of this application are incorporated herein by reference in their entirety.

BACKGROUND

The present disclosure relates to an inkjet ink set, an inkjet recording apparatus, and an inkjet recording method.

Non-absorbent recording media that do not absorb or hardly absorb water may be used in label printing and package printing. Various inks for image printing on the non-absorbent recording media are studied. For example, some water-based ink set for inkjet recording includes a water-based white ink for inkjet recording and a color ink different from the water-based white ink for inkjet recording. The water-based white ink for inkjet recording contains a white pigment, a pigment dispersion, a binder, and water, and is a styrene-based copolymer in which the pigment dispersion has a hydrophilic group.

SUMMARY

An inkjet ink set according to an aspect of the present disclosure includes a first ink and a second ink. The first ink contains a first pigment, a first binder, and a first aqueous medium. The second ink contains a second pigment, a second binder, and a second aqueous medium. The first binder has a Young's modulus of at least 600 $N/mm^2$ and no greater than 1600 $N/mm^2$. The second binder has a Young's modulus of at least 350 $N/mm^2$ and no greater than 1600 $N/mm^2$.

An inkjet recording apparatus according to another aspect of the present disclosure includes a first ink, a second ink, a first recording head that ejects the first ink toward a recording medium, and a second recording head that ejects the second ink toward at least a part of an area of the recording medium to which the first ink has been ejected. The first ink contains a first pigment, a first binder, and a first aqueous medium. The second ink contains a second pigment, a second binder, and a second aqueous medium. The first binder has a Young's modulus of at least 600 $N/mm^2$ and no greater than 1600 $N/mm^2$. The second binder has a Young's modulus of at least 350 $N/mm^2$ and no greater than 1600 $N/mm^2$. The recording medium is a non-absorbent recording medium.

An inkjet recording method according to another aspect of the present disclosure includes: ejecting a first ink toward a recording medium; and ejecting a second ink toward at least a part of an area of the recording medium to which the first ink has been ejected. The first ink contains a first pigment, a first binder, and a first aqueous medium. The second ink contains a second pigment, a second binder, and a second aqueous medium. The first binder has a Young's modulus of at least 600 $N/mm^2$ and no greater than 1600 $N/mm^2$. The second binder has a Young's modulus of at least 350 $N/mm^2$ and no greater than 1600 $N/mm^2$. The recording medium is a non-absorbent recording medium.

BRIEF DESCRIPTION OF THE DRAWINGS

FIGURE is a diagram illustrating an example of an inkjet recording apparatus according to a second embodiment of the present disclosure.

DETAILED DESCRIPTION

The terms described in the present specification are explained first. In the following, the term "(meth)acryl" is used as a generic term for both acryl and methacryl.

The glass transition point is a value as measured using a dynamic viscoelasticity measuring device (e.g., "RHEO-GEL-E4000", product of UBM Inc.) unless otherwise stated. The heat softening temperature and the heat melting temperature are values as measured using a capillary rheometer (e.g., "CFT-500D", product of SHIMADZU CORPORATION) unless otherwise stated. In measurement using the capillary rheometer, the outflow start temperature is defined as the thermal softening temperature and the ½ method temperature is defined as the thermal melting temperature. The volume median diameter is a value ($D_{50}$) at cumulative 50% in a particle size distribution in terms of volume. The volume median diameter is a value as measured using a dynamic light scattering type particle size distribution analyzer (e.g., "ZETASIZER (registered Japanese trademark) NANO ZS", product of Malvern Instruments Ltd.) unless otherwise stated. One type of each component described in the present specification may be used independently, or two or more types of the component may be used in combination. The terms described in the present specification have been explained so far.

First Embodiment: Inkjet Ink Set

An inkjet ink set (also referred to below simply as an ink set) according to a first embodiment of the present disclosure includes a first ink and a second ink. The first ink and the second ink are accommodated in containers different from each other, for example. Preferably, the first ink is used for background image printing on recording media and the second ink is used for printing images on the background images. That is, it is preferable that the first ink is an ink for printing background images and the second ink is an ink to be ejected toward background images.

The first ink and the second ink included in the ink set of the first embodiment are especially suitably used in printing on non-absorbent recording media. The non-absorbent recording media each are a recording medium that does not absorb or hardly absorbs water. Examples of the non-absorbent recording media include foil paper, overhead projector (OHP) sheets, and plastic recording media. The plastic recording media have a sheet shape or a film shape. Examples of the plastic recording media include polyester (e.g., PET) recording media, polypropylene recording media, polystyrene recording media, and polyvinyl chloride recording media. One or both sides of the non-absorbent recording medium may be or may not be surface treated. Examples of the surface treatment include corona discharge treatment, plasma treatment, and primer treatment.

Here, the ink set of the first embodiment have the following features. The first ink included in the ink set of the first embodiment contains a first pigment, a first binder, and a first aqueous medium. The second ink included in the ink set of the first embodiment contains a second pigment, a second binder, and a second aqueous medium. The first binder has a Young's modulus of at least 600 $N/mm^2$ and no greater than 1600 N/mm$^2$. The second binder has a Young's modulus of at least 350 N/mm$^2$ and no greater than 1600 N/mm$^2$. As a result of having the above features, the ink set of the first embodiment can print images with excellent scratch resistance and adhesion on the non-absorbent recording medium. The reasons for this are inferred as follows.

Unlike absorbent recording media that absorb water, such as paper, the non-absorbent recording medium does not absorb or hardly absorbs water. As such, a typical water-based ink will remain on the surface of the non-absorbent recording medium without being absorbed after being ejected onto the non-absorbent recording medium. Therefore, the typal water-based ink has insufficient scratch resistance and adhesion to the non-absorbent recording medium.

By contrast, the Young's modulus of the first binder is relatively high, at least 600 N/mm$^2$ and no greater than 1600 N/mm$^2$, in the ink set of the first embodiment. The first binder (binding agent), which has a higher Young's modulus, has a higher rigidity, so the first ink firmly bonds to the non-absorbent recording medium. As a result, the first ink can have increased scratch resistance and adhesion to the non-absorbent recording medium.

Furthermore, the Young's modulus of the second binder is relatively high, at least 350 N/mm$^2$ and no greater than 1600 N/mm$^2$, in the ink set of the first embodiment. The second binder (binding agent), which has a higher Young's modulus, has a higher rigidity, so the second ink firmly bonds to a first ink film formed as a result of the first ink ejected onto the non-absorbent recording medium being dried. Thus, scratch resistance and adhesion of the second ink to the first ink film (e.g., a film forming a background image) on the non-absorbent recording medium increase.

From the above, the ink set of the first embodiment can print images with excellent scratch resistance and adhesion on the non-absorbent recording medium.

<First Binder and Second Binder>

As descried previously, the first binder contained in the first ink has a Young's modulus of at least 600 N/mm$^2$ and no greater than 1600 N/mm$^2$. In order to print images with excellent scratch resistance and adhesion on the non-absorbent recording medium, the Young's modulus of the first binder is preferably at least 1000 N/mm$^2$ and no greater than 1600 N/mm$^2$, and more preferably at least 1300 N/mm$^2$ and no greater than 1600 N/mm$^2$.

As described previously, the second binder contained in the second ink has a Young's modulus of at least 350 N/mm$^2$ and no greater than 1600 N/mm$^2$. In order to print images with excellent scratch resistance and adhesion on the non-absorbent recording medium, the Young's modulus of the second binder is preferably at least 350 N/mm$^2$ and less than 1000 N/mm$^2$, and more preferably at least 600 N/mm$^2$ and no greater than 900 N/mm$^2$.

The Young's modulus of each binder (first binder and second binder) can be measured by the following method, for example. That is, a water dispersion of the binder is obtained by mixing 30 parts by mass of the binder and 70 parts by mass of water. A binder film with a film thickness of 500 μm is generated in a manner that the water dispersion of the binder is added into a TEFLON (registered Japanese trademark) coated Schale, dried at room temperature (25° C.) for 15 hours, dried at 80° C. for 6 hours, and then dried at 120° C. for 20 minutes. The Young's modulus (unit: N/mm$^2$) thereof is obtained by performing a tensile strength test by a method in accordance with the Japanese Industrial Standards (JIS) K6251:2017.

The Young's modulus of the first binder may be equal to or lower than the Young's modulus of the second binder.

However, the Young's modulus of the first binder is preferably higher than the Young's modulus of the second binder for the reasons described below. The composition of the first ink significantly differs from the composition of the non-absorbent recording medium, so the first ink does not easily bond to the non-absorbent recording medium. As such, the first binder contained in the first ink needs to have a high rigidity in order to firmly bond to the non-absorbent recording medium. By contrast, the composition of the second ink is relatively similar to the composition of the first ink, so the second ink easily bonds to the first ink film. As such, the second ink sufficiently bonds to the first ink film even when the rigidity of the second binder contained in the second ink is lower than the rigidity of the first binder.

In order to print images with excellent scratch resistance and adhesion on the non-absorbent recording medium, a difference (E1–E2) between the Young's modulus (E1) of the first binder and the Young's modulus (E2) of the second binder is preferably at least –650 and no greater than 950, more preferably greater than 0 and no greater than 950, further preferably at least 300 and no greater than 950, further more preferably at least 500 and no greater than 950, and particularly preferably at least 500 and no greater than 700.

The first binder and the second binder are water insoluble polymers. Preferably, emulsified particles constituted by the first binder are dispersed in the first aqueous medium. It is also preferable that emulsified particles constituted by the second binder are dispersed in the second aqueous medium.

No particular limitations are placed on the first binder and the second binder, and examples thereof include polyurethane, acrylic resin, styrene-acrylic resin, acrylic urethane resin, polyester resin, and modified polyolefin resin.

Preferably, both the first binder and the second binder are polyurethanes. As a result of both the first binder and the second binder being polyurethanes, scratch resistance and adhesion of the first ink to the non-absorbent recording medium increase in presence of a polar group of the polyurethane of the first ink. Also, as a result of both the first binder and the second binder being polyurethanes, scratch resistance and adhesion of the second ink to the first ink film increase because the composition of the first binder and the composition of the second binder resin are the same as or similar to each other.

In one preferable example for printing images with excellent scratch resistance and adhesion on the non-absorbent recording medium, the first binder is a polyurethane with a Young's modulus of at least 1000 N/mm$^2$ and no greater than 1600 N/mm$^2$ and the second binder is a polyurethane with a Young's modulus of at least 350 N/mm$^2$ and less than 1000 N/mm$^2$. It is further preferable that the first binder is a polyurethane with a Young's modulus of at least 1000 N/mm$^2$ and no greater than 1600 N/mm$^2$ and the second binder is a polyurethane with a Young's modulus of at least 700 N/mm$^2$ and less than 1000 N/mm$^2$ or that the first binder is a polyurethane with a Young's modulus of at least 1000 N/mm$^2$ and no greater than 1600 N/mm$^2$ and the second binder is a polyurethane with a Young's modulus of at least 350 N/mm$^2$ and less than 700 N/mm$^2$.

In another preferable example for printing images with excellent scratch resistance and adhesion on the non-absorbent recording medium, the first binder is a polyurethane with a Young's modulus of at least 700 N/mm$^2$ and no greater than 1000 N/mm$^2$ and the second binder is a polyurethane with a Young's modulus of at least 350 N/mm$^2$ and less than 700 N/mm$^2$.

Examples of polyurethanes that can be used as the first binder or the second binder include non-yellowing polyurethane and polyurethane (also referred to below as aromatic-containing polyurethane) including a repeating unit derived from an aromatic isocyanate. Examples of the aromatic-containing polyurethane include polyurethanes including a repeating unit derived from an aromatic isocyanate ether. The non-yellowing polyurethane is a polyurethane that hardly yellows or does not yellow when irradiated for example with ultraviolet rays. The non-yellowing polyurethane includes a repeating unit derived from either or both an aliphatic isocyanate and an alicyclic isocyanate, for example. The non-yellowing polyurethane may include a repeating unit derived from an aromatic isocyanate. However, in order to inhibit yellowing, the non-yellowing polyurethane preferably does not include a repeating unit derived from an aromatic isocyanate. When the non-yellowing polyurethane includes a repeating unit derived from an aromatic isocyanate, the percentage content of the repeating unit derived from an aromatic isocyanate in all repeating units of the non-yellowing polyurethane is preferably lower than the percentage content of the repeating unit derived from an aromatic isocyanate in all repeating units of the aromatic-containing polyurethane. Examples of the non-yellowing polyurethane include non-yellowing polyurethanes including a repeating unit derived from isocyanate ester/ether and non-yellowing polyurethanes including a repeating unit derived from isocyanate carbonate.

In order to print images with excellent scratch resistance and adhesion on the non-absorbent recording medium, the first binder is preferably an aromatic-containing polyurethane. For the same purpose as above, it is more preferable that the second binder is a non-yellowing polyurethane.

Each of the polyurethanes is not limited particularly and may be a polyurethane having a urethane bond in its molecule. An emulsion may be used in which emulsified particles constituted by the polyurethane are dispersed in the corresponding aqueous medium. Examples of commercially available products of the polyurethane emulsion include SUPERFLEX (registered Japanese trademark) 870 (Young's modulus 1486 N/mm²), SUPERFLEX 170 (Young's modulus 884 N/mm²), SUPERFLEX 420 (Young's modulus 565 N/mm²), SUPERFLEX 126 (Young's modulus 1328 N/mm²), SUPERFLEX 150 (Young's modulus 807 N/mm²), SUPERFLEX 150HS (Young's modulus 798 N/mm²), SUPERFLEX 210 (Young's modulus 1396 N/mm²), SUPERFLEX 420NS (Young's modulus 565 N/mm²), SUPERFLEX 650 (Young's modulus 374 N/mm²), SUPERFLEX 820 (Young's modulus 1394 N/mm²), SUPERFLEX 830HS (Young's modulus 1052 N/mm²), and SUPERFLEX 860 (Young's modulus 1288 N/mm²) each produced by DKS Co. Ltd. Among these commercially available polyurethane products, a polyurethane with a Young's modulus of at least 600 N/mm² and no greater than 1600 N/mm² can be used as the first binder. Among these commercially available polyurethane products, a polyurethane with a Young's modulus of at least 350 N/mm² and no greater than 1600 N/mm² can be also used as the second binder.

In order to print images with excellent scratch resistance and adhesion on the non-absorbent recording medium, the first binder and the second binder are preferably anionic.

In order to print images with excellent scratch resistance and adhesion on the non-absorbent recording medium, the first binder has a glass transition point of preferably at least 70° C. and no greater than 80° C., more preferably at least 75° C. and no greater than 78° C., and further preferably at least 76° C. and no greater than 78° C. For the same purpose as above, the second binder has a glass transition point of preferably at least −20° C. and no greater than 80° C., more preferably at least −10° C. and no greater than 78° C., and further preferably at least −10° C. and no greater than 75° C.

In order to print images with excellent scratch resistance and adhesion on the non-absorbent recording medium, the first binder has a thermal softening temperature of preferably at least 70° C. and no greater than 200° C., more preferably at least 79° C. and no greater than 188° C., and further preferably at least 70° C. and no greater than 180° C. For the same purpose as above, the second binder has a thermal softening temperature of preferably at least 70° C. and no greater than 200° C., more preferably at least 79° C. and no greater than 198° C., and further preferably at least 188° C. and no greater than 198° C.

In order to print images with excellent scratch resistance and adhesion on the non-absorbent recording medium, the first binder has a thermal melting temperature of preferably at least 120° C. and no greater than 200° C., more preferably at least 125° C. and no greater than 194° C., and further preferably at least 125° C. and no greater than 190° C. For the same purpose as above, the second binder has a thermal melting temperature of preferably at least 120° C. and no greater than 210° C., more preferably at least 125° C. and no greater than 205° C., and further preferably at least 194° C. and no greater than 205° C.

In order to print images with excellent scratch resistance and adhesion on the non-absorbent recording medium, the first binder has a percentage content of preferably at least 1% by mass and no greater than 10% by mass to the mass of the first ink, and more preferably at least 1% by mass and no greater than 5% by mass. For the same purpose as above, the second binder has a percentage content of preferably at least 1% by mass and no greater than 10% by mass to the mass of the second ink, and more preferably at least 1% by mass and no greater than 5% by mass.

<Pigment Particles>

The first pigment preferably constitutes first pigment particles together with pigment coating resin in the first ink. The first pigment particles each include a core containing the first pigment and a coat layer covering the core, for example. Also, the second pigment preferably constitutes second pigment particles together with pigment coating resin in the second ink. The second pigment particles each include a core containing the second pigment and a coat layer covering the core, for example. The coat layers are constituted by the pigment coating resin. At least a portion of the pigment coating resin covers the pigment. However, another portion of the pigment coating resin may be dissolved or dispersed in the respective aqueous media without covering the pigment.

In terms of optimizing color density, hue, and stability of the first ink, the first pigment particles have a volume median diameter of preferably at least 50 nm and no greater than 500 nm, and more preferably at least 100 nm and no greater than 400 nm. In terms of optimizing color density, hue, and stability of the second ink, the second pigment particles have a volume median diameter of preferably at least 30 nm and no greater than 200 nm, and more preferably at least 70 nm and no greater than 130 nm.

(First Pigment and Second Pigment)

Examples of the first pigment and the second pigment include non-white pigments (specific examples include yellow pigments, orange pigments, red pigments, blue pigments, violet pigments, and black pigments) and white pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7). Examples of the white pigments include C.I. Pigment White (4, 5, 6, 6:1, 7, 18, 19, 20, 21, 23, 24, 25, 26, 27, or 28). Alternatively, titanium oxide may be used as a white pigment. Among of all, surface treated titanium oxide is preferable in terms of exhibiting relatively favorable dispersibility in aqueous media. For example, titanium oxide surface treated with silica and alumina is preferable. Titanium oxide surface treated with silica and alumina and further surface treated with a silane coupling agent is also preferable.

Because of being used for printing background images, the first pigment is preferably a white pigment and the first ink is preferably a white ink. Because of being used for printing images further on the background images, the second pigment is preferably a non-white pigment and the second ink is preferably a non-white ink.

The first pigment has a percentage content of preferably at least 5.0% by mass and no greater than 15.0% by mass to the mass of the first ink, and more preferably at least 5.0% by mass and no greater than 10.0% by mass. The second pigment has a percentage content of preferably at least 0.5% by mass and no greater than 10.0% by mass to the mass of the second ink, and more preferably at least 1.5% by mass and less than 5.0% by mass.

(Pigment Coating Resin)

Each of the pigment coating resins is a polymer dispersant for dispersing the pigment (first pigment or second pigment). The pigment coating resin is preferably a resin soluble in the corresponding aqueous medium. At least a portion of the pigment coating resin is present for example on the surfaces of the pigment particles (first pigment particles or second pigment particles) for optimizing dispersibility of the pigment particles. However, another portion of the pigment coating resin may be present in a state dissolved in the corresponding aqueous medium (first aqueous medium or second aqueous medium), for example. The first pigment and the second pigment each are a pigment (non-self-dispersion type pigment) dispersed in the corresponding aqueous medium by a dispersant such as the corresponding pigment coating resin, for example. However, the first pigment and the second pigment may each be a pigment (self-dispersion type pigment) dispersed in the corresponding aqueous medium without a dispersant.

Examples of the pigment coating resin include acrylic resin and styrene-acrylic resin. The acrylic resin includes at least a repeating unit derived from (meth)acrylic acid. The styrene-acrylic resin includes a repeating unit derived from styrene and a repeating unit derived from at least one monomer of (meth)acrylic acid alkyl ester and (meth)acrylic acid. Examples of the (meth)acrylic acid alkyl ester include methyl (meth)acrylate, ethyl (meth)acrylate, propyl (meth)acrylate, and butyl (meth)acrylate. The styrene-acrylic resin is preferably a copolymer of styrene, methyl methacrylate, methacrylic acid, and butyl acrylate.

A commercially available product may be used as the pigment coating resin. Examples of the commercially available product of the pigment coating resin include JONCRYL (registered Japanese trademark) 586 and JONCRYL 611 each produced by BASF Japan Ltd., DISPERBYK (registered Japanese trademark)-190 and DISPERBYK-191 each produced by BYK Chemie Japan, K.K., and SOLSPERSE 20000 and SOLSPERSE 27000 each produced by Lubrizol Japan Limited. DISPERBYK-190 is an acrylic polymer dispersant, and more specifically, an acrylic block copolymer with a pigment affinity group.

The ratio of the mass of the pigment coating resin to the mass of the pigment (the first pigment or the second pigment) is preferably at least 0.02 and no greater than 0.45, and more preferably at least 0.05 and no greater than 0.15. As a result of the ratio of the mass of the pigment coating resin to the mass of the pigment being no greater than 0.45, each viscosity of the pigment dispersion and the ink (the first ink or the second ink) can be easily adjusted to a desired value. As a result of the ratio of the mass of the pigment coating resin to the mass of the pigment being at least 0.02, dispersion stability of the ink (the first ink or the second ink) can be increased.

<First Aqueous Medium and Second Aqueous Medium>

The first aqueous medium and the second aqueous medium each are a medium containing water. The first aqueous medium and the second aqueous medium may each function as a solvent or a dispersion medium. Specific examples of the first aqueous medium and the second aqueous medium include aqueous media containing water and a water-soluble organic solvent.

Examples of the water-soluble organic solvent include monohydric alcohols, glycol compounds, triol compounds, glycol ether compounds, lactam compounds, nitrogen-containing compounds, acetate compounds, γ-butyrolactone, thiodiglycol, and dimethyl sulfoxide.

Examples of the monohydric alcohols include methanol, ethanol, propanols (e.g., 1-propanol and 2-propanol), and butanol. A preferable monohydric alcohol is 2-propanol.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is propylene glycol.

Examples of the triol compounds include glycerin, 1,2, 3-butanetriol, and 1,2,6-hexanetriol.

Examples of the glycol ether compounds include alkylene glycol alkyl ethers, and more specific examples include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether (i.e., butyl triglycol), and propylene glycol monomethyl ether. A preferable glycol ether compound is triethylene glycol monobutyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

A solvent mixture of water, 2-propanol, propylene glycol, and triethylene glycol monobutyl ether is preferable as the aqueous media.

The first aqueous medium has a percentage content of preferably at least 30% by mass and no greater than 95% by mass to the mass of the first ink, and more preferably at least 70% by mass and no greater than 95% by mass. The water-soluble organic solvent contained in the first ink has a percentage content of preferably at least 10% by mass and no greater than 50% by mass to the mass of the first ink, and more preferably at least 30% by mass and no greater than 40% by mass.

The second aqueous medium has a percentage content of preferably at least 30% by mass and no greater than 95% by mass to the mass of the second ink, and more preferably at least 70% by mass and no greater than 95% by mass. The water-soluble organic solvent contained in the second ink has a percentage content of preferably at least 10% by mass and no greater than 50% by mass to the mass of the second ink, and more preferably at least 30% by mass and no greater than 40% by mass.

<Surfactant>

The first ink and the second ink may each contain a surfactant. Examples of the surfactant include acetylene surfactants, acrylic surfactants, silicone surfactants, and fluroic surfactants. The acetylene surfactants in the present specification refer to surfactants having an acetylene bond (triple bond between carbon atoms) in their molecules. The acrylic surfactants in the present specification refer to surfactants that are polymers of (meth)acrylic acid or derivatives thereof. The fluroic surfactants in the present specification refer to surfactants with a fluoro group in their molecules.

The surfactant is preferably a silicone surfactant. The silicone surfactant refers to a surfactant having a siloxane bond in its molecule. Examples of commercially available products of the silicone surfactant include SILFACE (registered Japanese trademark) SAG002 and SILFACE SAG503A each produced by Nissin Chemical Industry Co., Ltd.

The surfactant contained in the first ink preferably has a percentage content of at least 0.01% by mass and no greater than 1.00% by mass to the mass of the first ink. The surfactant contained in the second ink preferably has a percentage content of at least 0.01% by mass and no greater than 1.00% by mass to the mass of the second ink.

<Optional Component>

The first ink and the second ink may each contain an optional component according to necessity. Examples of the optional component include a pH adjuster, a chelating agent, a preservative, and a fungicide. The percentage content of the optional component is not limited particularly and may be appropriately set according to necessity.

<Method for Producing First Ink or Second Ink>

A method for producing the first ink or the second ink includes a pigment dispersion preparation process and a mixing process.

In the pigment dispersion preparation process for the first ink, the first pigment, the first aqueous medium, and the pigment coating resin as necessary are mixed using a disperser, for example. In the pigment dispersion preparation process for the second ink, the second pigment, the second aqueous medium, and the pigment coating resin as necessary are mixed using a disperser, for example. The dispersers are not limited particularly and examples thereof include ball mills and bead mills. Among these, a bead mill is preferably used. Examples of the bead mill include an ATTRITOR (registered Japanese trademark) (product of Nippon Coke & Engineering Co., Ltd.), a sand grinder (product of Aimex Co. Ltd.), a DYNO (registered Japanese trademark) mill (product of Willy A. Bachofen AG (WAB)), and an Ultra Apex Mill (product of Hiroshima Metal & Machinery Co., Ltd.). When coarse particles are contained in the either resultant pigment dispersion, the coarse particles are preferably removed by filtration or centrifugation.

In the mixing process for the first ink, the pigment dispersion containing the first pigment, the first binder, the first aqueous medium added further, and a component (e.g., a surfactant) added as necessary are mixed to obtain the first ink. In the mixing process for the second ink, the pigment dispersion containing the second pigment, the second binder, the second aqueous medium further added, and a component (e.g., a surfactant) added as necessary are mixed to obtain the second ink. When coarse particles are contained in the first ink or the second ink, the coarse particles are preferably removed by filtration or centrifugation.

Second Embodiment: Inkjet Ink Recording Apparatus

With reference to FIGURE, an inkjet recording apparatus 1, which is one example of the inkjet recording apparatus according to a second embodiment of the present disclosure, is described below. FIGURE illustrates the inkjet recording apparatus 1 of the second embodiment.

The inkjet recording apparatus 1 of the second embodiment includes a first ink, a second ink, a sheet feed roller 2, a plurality of conveyance roller pairs 3, a sensor 4, a first recording head 5, a second recording head 6, a conveyor belt 7, and an ejection roller pair 8. In the second embodiment, the first ink is accommodated in the first recording head 5 and the second ink is accommodated in the second recording head 6.

The first ink and the second ink are respectively the first ink and the second ink included in the ink set of the first embodiment. As such, the inkjet recording apparatus 1 of the second embodiment can print images with excellent scratch resistance and adhesion on a recording medium X (e.g., a non-absorbent recording medium) for the same reasons as those described in the first embodiment.

The inkjet recording apparatus 1 accommodates sheets of the recording medium X in a sheet feed cassette (not illustrated). The recording medium X is a non-absorbent recording medium, for example.

The sheet feed roller 2 rotates to feed the sheets of the recording medium X one by one from the uppermost sheet.

The conveyance roller pairs 3 convey the fed recording medium X to the conveyor belt 7.

The conveyor belt 7 is an endless belt horizontally wound between a pair of rollers. The recording medium X conveyed by the conveyance roller pairs 3 is conveyed to the ejection roller pair 8 as the conveyor belt 7 runs.

The sensor 4 is located above the conveyor belt 7. The sensor 4 is also located upstream of the first recording head 5 in terms of a conveyance direction of the recording medium X. The sensor 4 detects the leading end of the recording medium X being conveyed by the conveyor belt 7. Based on the time when the sensor 4 detects the leading end of the recording medium X, a first ink ejection instruction is output to the first recording head 5 and a second ink ejection instruction is output to the second recording head 6.

The first recording head 5 and the second recording head 6 are provided above the conveyor belt 7. The first recording head 5 is provided upstream of the second recording head 6 in terms of a direction in which the conveyor belt 7 runs (corresponding to the conveyance direction of the recording medium X). The first recording head 5 and the second recording head 6 are long line scan type recording head with a width equal to or larger than the width of the recording medium X, for example. The first recording head 5 and the second recording head 6 include many nozzles in their lower surfaces (ejection surfaces) facing the conveyor belt 7. The first recording head 5 and the second recording head 6 extend in a direction perpendicular to the conveyance direction of the recording medium X and are fixed to the inkjet recording apparatus 1. Specifically, the first recording head 5 and the second recording head 6 are fixed to the inkjet recording apparatus 1 so that their lower surfaces are out of contact with the recording medium X on the conveyor belt 7.

The first recording head 5 accommodates the first ink included in the ink set of the first embodiment. While the recording medium X is being conveyed by the conveyor belt 7, the first recording head 5 (more specifically, the many nozzles of the first recording head 5) ejects the first ink toward the recording medium X. A background image (white image) is printed on the recording medium X in the manner described above. The first ink may be ejected to the entirety of the recording medium X. However, the background image can be printed with a small amount of the first ink, and it is therefore preferable that the first ink is ejected toward only an area of the recording medium X where the second ink is to be ejected or toward an area thereof that is wider than an area thereof to which the second ink is to be ejected.

The second recording head 6 accommodates the second ink of the ink set of the first embodiment. After the first ink is ejected from the first recording head 5, the second recording head 6 (more specifically, the many nozzles of the second recording head 6) ejects the second ink toward the recording medium X. In detail, the second recording head 6 ejects the second ink toward at least a part (e.g., a part or the entirety) of the area of the recording medium X to which the first ink has been ejected.

The recording medium X to which the second ink has been ejected from the second recording head 6 continues to be conveyed by the conveyor belt 7. The recording medium X is then delivered to the ejection roller pair 8 at the terminal end of the conveyor belt 7, and ejected from the conveyor belt 7 then.

The ejection roller pair 8 ejects the recording medium X. In the manner described above, the background image (e.g., a white image) is printed on the recording medium X with the first ink and an image (e.g., a non-white image) is printed on the background image with the second ink.

The inkjet recording apparatus 1, which is one example of the inkjet recording apparatus according to the second embodiment, has been described so far with reference to FIGURE. However, the inkjet recording apparatus of the second embodiment is not limited to the aforementioned inkjet recording apparatus 1 and can be changed as in the following first to fourth variations, for example.

The first variation is as follows. An example in which the recording medium X cut into a specific size (e.g., A4 size) is used is presented for the inkjet recording apparatus 1. However, a rolled recording medium may be used, for example.

The second variation is as follows. An example in which two recording heads such as the first recording head 5 and the second recording head 6 are provided is presented for the inkjet recording apparatus 1. However, three or more recording heads may be provided. For example, when a plurality of recording heads that eject the second ink are provided, images with multiple colors can be printed.

The third variation is as follows. An example in which no wiping blade is provided is presented for the inkjet recording apparatus 1. However, wiping blades may be provided that wipe the ejection surfaces of the first recording head 5 and the second recording head 6.

The fourth variation is as follows. An example in which the first recording head 5 and the second recording head 6 are of line scan type is presented for the inkjet recording apparatus 1. However, serial scan type recording heads that run relative to the recording medium X may be provided.

Third Embodiment: Inkjet Ink Recording Method

With reference further to FIGURE, an inkjet recording method according to a third embodiment of the present disclosure is described. The inkjet recording method of the third embodiment uses a first ink and a second ink. The first ink and the second ink are respectively the first ink and the second ink included in the ink set of the first embodiment. The inkjet recording method of the third embodiment includes ejecting the first ink toward a recording medium X (first ink ejection process) and ejecting the second ink toward at least a part of an area of the recording medium X to which the first ink has been ejected (second ink ejection process). The recording medium X is a non-absorbent recording medium, for example.

The first ink and the second ink used in the inkjet recording method of the third embodiment are respectively the first ink and the second ink of the ink set of the first embodiment. As such, the inkjet recording method of the third embodiment can achieve printing of images with excellent scratch resistance and adhesion on the non-absorbent recording medium for the same reasons as those described in the first embodiment.

The inkjet recording method of the third embodiment is implemented by using the inkjet recording apparatus 1 of the second embodiment, for example. In the first ink ejection process, the first recording head 5 ejects the first ink toward the recording medium X. In the second ink ejection process, the second recording head 6 ejects the second ink toward at least a part of an area of the recording medium X to which the first ink has been ejected. The inkjet recording method according to the third embodiment has been described so far with reference to FIGURE.

Examples

The following presents examples for providing further detailed description of the present disclosure. However, the present disclosure is not limited thereto. In Examples below, "ion exchange water" may be referred to simply as "water". <Production of White Pigment Dispersion>

Using a disperser, 100 parts by mass of a white pigment, 25 parts by mass of a pigment coating resin, 10 parts by mass of 2-propanol, and 65 parts by mass of water were mixed to obtain a pre-dispersion. The white pigment used was titanium oxide ("JR-804", product of TAYCA CORPORA-TION). The pigment coating resin used was "DISPERBYK-190" (solid concentration: 40% by mass, dispersion medium:water) produce by BYK Chemie Japan, K.K. Next, the pre-dispersion was further mixed using a bead mill ("DYNO (registered Japanese trademark) MILL", product of Willy A. Bachofen AG (WAB)) loaded with zirconia beads with a diameter of 0.3 mm to obtain a white pigment dispersion.

<Preparation of Cyan Pigment Dispersion>

"AE2034F" produced by SANYO COLOR WORKS, Ltd. was used as a cyan pigment dispersion.

<Binder Preparation>

The following binders were prepared for use of preparation of white inks and cyan inks.

Binder A1: polyurethane ("SUPERFLEX (registered Japanese trademark) 870", product of DKS Co. Ltd., Young's modulus 1486 N/mm$^2$, non-volatile content 30% by mass, anionic binder, glass transition point 78° C., thermal softening temperature 79° C., thermal melting temperature 125° C.) including a repeating unit derived from aromatic isocyanate ether Binder A2: non-yellowing polyurethane ("SUPERFLEX (registered Japanese trademark) 170", product of DKS Co. Ltd., Young's modulus 884 N/mm$^2$, non-volatile content 33% by mass, anionic binder, glass transition point 75° C., thermal softening temperature 188° C., thermal melting temperature 194° C.) including a repeating unit derived from isocyanate ester/ether Binder A3: non-yellowing polyurethane ("SUPERFLEX (registered Japanese trademark) 420", product of DKS Co. Ltd., Young's modulus 565 N/mm$^2$, non-volatile content 32% by mass, anionic binder, glass transition point –10° C., thermal softening temperature 198° C., thermal melting temperature 205° C.) including a repeating unit derived from isocyanate carbonate Binder A4: non-yellowing polyurethane ("SUPERFLEX (registered Japanese trademark) 500M", product of DKS Co. Ltd., Young's modulus 319 N/mm$^2$, non-volatile content 45% by mass, nonionic binder, glass transition point –39° C., thermal softening temperature 62° C., thermal melting temperature 67° C.) including a repeating unit derived from isocyanate ester Binder A5: non-yellowing polyurethane ("SUPERFLEX (registered Japanese trademark) 470", product of DKS Co. Ltd., Young's modulus 13 N/mm$^2$, non-volatile content 38% by mass, anionic binder, glass transition point –31° C., thermal softening temperature 97° C., thermal melting temperature 138° C.) including a repeating unit derived from isocyanate carbonate <White Ink Production>

White inks (I-W1) to (I-W5) were produced. The compositions of these white inks are shown in Table 1.

TABLE 1

| | White ink | I-W1 | I-W2 | I-W3 | I-W4 | I-W5 |
|---|---|---|---|---|---|---|
| Blending amount | White pigment dispersion | 13 | 13 | 13 | 13 | 13 |
| [part by mass] | Binder A1 | 3 | — | — | — | — |
| | Binder A2 | — | 3 | — | — | — |
| | Binder A3 | — | — | 3 | — | — |
| | Binder A4 | — | — | — | 3 | — |
| | Binder A5 | — | — | — | — | 3 |
| | Propylene glycol | 25 | 25 | 25 | 25 | 25 |
| | Butyl triglycol | 8 | 8 | 8 | 8 | 8 |
| | Surfactant | 0.4 | 0.4 | 0.4 | 0.4 | 0.4 |
| | Water | Rest | Rest | Rest | Rest | Rest |
| | Total | 100 | 100 | 100 | 100 | 100 |

The terms in Table 1 and Table 2 described later are as follows.

Surfactant: silicone surfactant ("SILFACE SAG 502A", product of Nissin Chemical Industry Co., Ltd.)

Blending amount: blending amount of corresponding component Where the corresponding component is a binder, the blending amount of the binder indicates a blending amount of the non-volatile content (solid content) of the binder.

Rest: remaining amount, that is, the amount that gives the ink 100 parts by mass -: no containment of a corresponding component (Production of White Ink (I-W1))

Components were charged into a vessel to give the blending amounts in a white ink the blending amounts shown in the column titled White ink (I-W1) in Table 1. The vessel contents were stirred to be uniformly mixed at a rotational speed 400 rpm using a stirrer ("THREE-ONE MOTOR BL-600", product of Shinto Scientific Co., Ltd.). The mixed liquid was filtered using a filter with a pore size of 5 m, and foreign matter and coarse particles were removed from the resultant mixed liquid. As a result, a white ink (I-W1) was obtained.

(Production of White Inks (I-W2) to (I-W5))

White inks (I-W2) to (I-W5) were produced according to the same method as that for producing the white ink (I-W1) in all aspects other than that components were charged into vessels to give the blending amounts in the corresponding white inks the blending amounts shown in the columns titled White inks (I-W2) to (I-W5) in Table 1.

<Cyan Ink Production>

Cyan inks (I-C1) to (I-C5) were produced. The compositions of these cyan inks are shown in Table 2. The cyan inks (I-C1) to (I-C5) were produced according to the same method as that for producing the white ink (I-W1) in all aspects other than that components were charged into vessels to give the blending amounts in the corresponding cyan inks the blending amounts shown in the columns titled Cyan inks (I-C1) to (I-C5) in Table 1.

onto the non-absorbent recording medium using a bar coater (#02). The non-absorbent recording medium with the first ink applied thereto was dried at 80° C. for 2 minutes to form a dried coating film (first ink film) of the first ink with a thickness of 6 μm on the entirety of the non-absorbent recording medium. The non-absorbent recording medium with the first ink film formed thereon was used as an evaluation recording medium 1.

<Scratch Resistance of First Ink to Non-absorbent Recording Medium>

A weight with a load of 1000 g was placed on the first ink film on the evaluation recording medium 1. Using the weight, the first ink film on the evaluation recording medium 1 was rubbed one time to apply the dead weight of the weight. The rubbed first ink film was observed with the naked eye to confirm the ratio (peeling area ratio) of the area of an area where the first ink film has been peeled to the entire area of the first ink film. When there were a plurality of areas where the first ink film has been peeled, the ratio of the total of the areas of the areas where the first ink film has been peeled to the entire area of the first ink film was taken to be the peeling area ratio. Scratch resistance of the first ink to the non-absorbent recording medium was evaluated according to the following criteria. Cases rated as A or B in the evaluation were determined to be passed, and cases rated as C or D were determined to be failed.

(Criteria of Scratch Resistance of First Ink to Non-absorbent Recording Medium)

A: pealing area ratio of 0%

B: pealing area ratio of greater than 0% and no greater than 5%

C: pealing area ratio of greater than 5% and no greater than 10%

D: pealing area ratio of 10% or more

<Adhesion of First Ink to Non-absorbent Recording Medium>

On the first ink film on the evaluation recording medium 1, 6 vertical incisions and 6 horizontal incisions were made

TABLE 2

| | Cyan ink | I-C1 | I-C2 | I-C3 | I-C4 | I-C5 |
|---|---|---|---|---|---|---|
| Blending amount | Cyan pigment dispersion | 5 | 5 | 5 | 5 | 5 |
| [part by mass] | Binder A1 | 3 | — | — | — | — |
| | Binder A2 | — | 3 | — | — | — |
| | Binder A3 | — | — | 3 | — | — |
| | Binder A4 | — | — | — | 3 | — |
| | Binder A5 | — | — | — | — | 3 |
| | Propylene glycol | 25 | 25 | 25 | 25 | 25 |
| | Butyl triglycol | 8 | 8 | 8 | 8 | 8 |
| | Surfactant | 0.4 | 0.4 | 0.4 | 0.4 | 0.4 |
| | Water | Rest | Rest | Rest | Rest | Rest |
| | Total | 100 | 100 | 100 | 100 | 100 |

[Study 1: Young's Modulus of First Binder]

First, the Young's modulus of the first binder contained in the first ink was studied. With respect to each of the white inks (I-W1) to (I-W5) each being the first ink, scratch resistance and adhesion of the first ink to a non-absorbent recording medium were evaluated by the following methods. The evaluation results are shown below in Tables 3.

<Production of Evaluation Recording Medium 1>

As the non-absorbent recording medium, a PET film ("LUMIRROR (registered Japanese trademark) #50-S10", product of Toray Industries, Inc., B5 size) was used. A first ink (any of the white inks (I-W1) to (I-W5)) was applied in a lattice pattern (checkerboard pattern) with intervals of 1 mm to form 25 square grids of 1 mm surrounded by the incisions in both the vertical and horizontal directions. Adhesive tape ("CELLOTAPE (registered Japanese trademark) CT-24", product of Nichiban Co., Ltd.) was attached onto the first ink film with the incisions, and peeled off at once at an angle of 45 degrees. After the peeling off of the adhesive tape, 25 grids of the first ink film were observed to count the number of grids where the first ink film has been peeled or chipped due to the peeling. Adhesion of the first ink to the non-absorbent recording medium was evaluated according to the following criteria. Cases rated as A or B in the evaluation were determined to be passed, and cases rated as C or D were determined to be failed.

(Criteria of Adhesion of First Ink to Non-absorbent Recording Medium)

A: The number of grids where peeling or chipping has occurred is 0.

B: The number of grids where peeling or chipping has occurred is at least 1 and no greater than 3.

C: The number of grids where peeling or chipping has occurred is at least 4 and no greater than 6.

D: The number of grids where peeling or chipping has occurred is 7 or greater.

TABLE 3

| | First | To non-absorbent recording medium | |
| | ink | Scratch resistance | Adhesion |
|---|---|---|---|
| Example 1-1 | I-W1 | A | A |
| Example 1-2 | I-W2 | A | A |
| Comparative Example 1-1 | I-W3 | C | A |
| Comparative Example 1-2 | I-W4 | D | A |
| Comparative Example 1-3 | I-W5 | D | D |

The first binder (more specifically, any of the binder A3 to A5) contained in any of the white inks (I-W3) to (I-W5) had a Young's modulus of less than 600 N/mm². As shown in Table 3, at least one of scratch resistance and adhesion of the first inks (more specifically, the white inks (I-W3) to (I-W5)) to the non-absorbent recording medium was rated as failed.

By contrast, the first binder (more specifically, either binder A1 or A2) contained in either the white ink (I-W1) and (I-W2) had a Young's modulus of at least 600 N/mm² and no greater than 1600 N/mm². As shown in Table 3, both scratch resistance and adhesion of the white inks (I-W1) and (I-W2) to the non-absorbent recording medium were rated as passing.

[Study 2: Young's Modulus of Second Binder]

Next, the Young's modulus of the second binder contained in the second ink was studied. With respect to each of the cyan inks (I-C1) to (I-C5) each being the second ink, scratch resistance and adhesion of the second ink to the first ink film were evaluated using the white inks (I-W1) and (I-W2) as the first inks, each of which passed in Study 1 described above. The evaluation results are shown below in Table 4.

<Production of Evaluation Recording Medium 2>

Using a bar coater (#02), the second ink (any of the cyan inks (I-C1) to (I-C5)) was applied onto the first ink film on the evaluation recording medium 1 produced as described above. The non-absorbent recording medium with the second ink applied thereto was dried at 80° C. for 2 minutes to form a dried coating film (second ink film) of the second ink with a thickness of 6 m on the entirety of the first ink film. The non-absorbent recording medium with the second ink film formed on the first ink film thereof was used as an evaluation recording medium 2.

<Scratch Resistance of Second Ink to First Ink Film>

A weight with a load of 1000 g was placed on the second ink film on the evaluation recording medium 2. Using the weight, the second ink film on the evaluation recording medium 2 was rubbed one time to apply the dead weight of the weight. The rubbed dried coating film was observed with the naked eye to confirm the ratio (peeling area ratio) of the area of an area where the second ink film has been peeled to the entire area of the second ink film. When there were a plurality of areas where the second ink film has been peeled, the ratio of the total of the areas of the areas where the second ink film has been peeled to the entire area of the second ink film was taken to be the peeling area ratio. Scratch resistance of the second ink to the first ink film was evaluated according to the following criteria. Cases rated as A or B in the evaluation were determined to be passed, and cases rated as C or D were determined to be failed.

(Criteria of Scratch Resistance of Second Ink to First Ink Film)

A: pealing area ratio of 0%

B: pealing area ratio of greater than 0% and no greater than 5%

C: pealing area ratio of greater than 5% and no greater than 10%

D: pealing area ratio of greater than 10%

<Adhesion of Second Ink to First Ink Film>

On the second ink film on the evaluation recording medium 2, 6 vertical incisions and 6 horizontal incisions were made in a lattice pattern (checkerboard pattern) with intervals of 1 mm to form 25 square grids of 1 mm surrounded by the incisions in both the vertical and horizontal directions. Adhesive tape ("CELLOTAPE (registered Japanese trademark) CT-24", product of Nichiban Co., Ltd.) was attached onto the second ink film with the incisions, and peeled off at once at an angle of 45 degrees. After the peeling off of the adhesive tape, 25 grids of the second ink film were observed to count the number of grids where the second ink film has been peeled or chipped due to the peeling. Adhesion of the second ink to the first ink film was evaluated according to the following criteria. Cases rated as A or B in the evaluation were determined to be passed, and cases rated as C or D were determined to be failed.

(Criteria of Adhesion of Second Ink to First Ink Film)

A: The number of grids where peeling or chipping has occurred is 0.

B: The number of grids where peeling or chipping has occurred is at least 1 and no greater than 3.

C: The number of grids where peeling or chipping has occurred is at least 4 and no greater than 6.

D: The number of grids where peeling or chipping has occurred is 7 or more.

TABLE 4

| | | | | To first ink film | |
| | Ink set | First ink | Second ink | Scratch resistance | Adhesion |
|---|---|---|---|---|---|
| Example 2-1 | S-A1 | I-W1 | I-C2 | A | A |
| Example 2-2 | S-A2 | I-W1 | I-C3 | A | A |
| Example 2-3 | S-A3 | I-W2 | I-C3 | A | A |
| Example 2-4 | S-A4 | I-W2 | I-C1 | A | A |
| Comparative Example 2-1 | S-B1 | I-W1 | I-C4 | C | A |
| Comparative Example 2-2 | S-B2 | I-W2 | I-C4 | C | A |
| Comparative Example 2-3 | S-B3 | I-W1 | I-C5 | D | D |
| Comparative Example 2-4 | S-B4 | I-W2 | I-C5 | D | D |

Ink sets (S-B1) to (S-B4) each included a first ink (more specifically, either the white ink (I-W1) or (I-W2)) and a second ink (more specifically, either the cyan ink (I-C4) or (I-C5)). The first binder (more specifically, either the binder A1 or A2) contained in either the white ink (I-W1) or (I-W2)

had a Young's modulus of at least 600 N/mm$^2$ and no greater than 1600 N/mm$^2$. However, the second binder (more specifically, either the binder A4 or A5) contained in either the cyan ink (I-C4) or (I-C5) had a Young's modulus of less than 350 N/mm$^2$. When any of the ink sets (S-B1) to (S-B4) including either the cyan ink (I-C4) or (I-C5) as the second ink was used, at least one of scratch resistance and adhesion of the second ink to the first ink film was rated as failed as shown in Table 4.

By contrast, the ink sets (S-A1) to (S-A4) each included a first ink (more specifically, either the white ink (I-W1) or (I-W2)) and a second ink (more specifically, any of the cyan inks (I-C1) or (I-C3)). The first binder (more specifically, either the binder A1 or A2) contained in either the white ink (I-W1) or (I-W2) had a Young's modulus of at least 600 N/mm$^2$ and no greater than 1600 N/mm$^2$. The second binder (more specifically, any of the binders A1 to A3) contained in any of the cyan inks (I-C1) to (I-C3) had a Young's modulus of at least 350 N/mm$^2$ and no greater than 1600 N/mm$^2$. As described previously in Study 1, both scratch resistance and adhesion of the first ink to the non-absorbent recording medium was rated as passing for the first ink (more specifically, either the white ink (I-W1) or (I-W2)) included in any of the ink sets (S-A1) to (S-A4). Furthermore, both scratch resistance and adhesion of the second ink to the first ink film on the non-absorbent recording medium were rated as passing when any of the ink sets (S-A1) to (S-A4) was used as shown in Table 4.

From the above, it is determined that in the ink set according to the present disclosure, which encompasses the ink sets (S-A1) to (S-A4), the first ink has excellent scratch resistance and adhesion to the non-absorbent recording medium and the second ink has excellent scratch resistance and adhesion to the first ink film on the non-absorbent recording medium. It is accordingly determined that the ink set according to the present disclosure can print images with excellent scratch resistance and adhesion on the non-absorbent recording medium. Note that the first ink and the second ink were applied onto the non-absorbent recording medium using a bar coater in Studies 1 and 2 described above. However, it can be determined that similar advantages can be achieved by using the first ink, the second ink, and the non-absorbent recording medium even if the application method is different. Therefore, it can be determined that the inkjet recording apparatus and the inkjet recording method according to the present disclosure that use an ink set such as above can achieve printing of images with excellent scratch resistance and adhesion on the non-absorbent recording medium.

What is claimed is:

1. An inkjet ink set comprising:
a first ink; and
a second ink, wherein
the first ink contains a first pigment being a kind of a white pigment, a first binder, and a first aqueous medium,
the second ink contains a second pigment being a non-white pigment, a second binder, and a second aqueous medium,
the first binder has a Young's modulus of at least 600 N/mm$^2$ and no greater than 1600 N/mm$^2$,
the second binder has a Young's modulus of at least 350 N/mm$^2$ and no greater than 1600 N/mm$^2$, and
a difference (EI–E2) between the Young's modulus (E1) of the first binder and the Young's modulus (E2) of the second binder is at least 650 N/mm$^2$ and no greater than 950 N/mm$^2$.

2. The inkjet ink set according to claim 1, wherein the Young's modulus of the first binder is higher than the Young's modulus of the second binder.

3. The inkjet ink set according to claim 1, wherein the first binder is a polyurethane with a Young's modulus of at least 1000 N/mm$^2$ and no greater than 1600 N/mm$^2$, and
the second binder is a polyurethane with a Young's modulus of at least 350 N/mm$^2$ and less than 1000 N/mm$^2$.

4. The inkjet ink set according to claim 1, wherein the first binder is a polyurethane including a repeating unit derived from an aromatic isocyanate, and
the second binder is a non-yellowing polyurethane.

5. The inkjet ink set according to claim 1, wherein the first ink is a white ink.

6. The inkjet ink set according to claim 1, wherein the first ink is an ink for printing a background image, and
the second ink is an ink to be ejected toward the background image.

7. The inkjet ink set according to claim 1, wherein the first ink and the second ink are used for printing on a non-absorbent recording medium.

8. An inkjet recording apparatus comprising:
a first ink;
a second ink;
a first recording head that ejects the first ink toward a recording medium; and
a second recording head that ejects the second ink toward at least a part of an area of the recording medium to which the first ink has been ejected, wherein
the first ink contains a first pigment being a kind of a white pigment, a first binder, and a first aqueous medium,
the second ink contains a second pigment being a non-white pigment, a second binder, and a second aqueous medium,
the first binder has a Young's modulus of at least 600 N/mm$^2$ and no greater than 1600 N/mm$^2$,
the second binder has a Young's modulus of at least 350 N/mm$^2$ and no greater than 1600 N/mm$^2$,
the recording medium is a non-absorbent recording medium, and
a difference (EI–E2) between the Young's modulus (E1) of the first binder and the Young's modulus (E2) of the second binder is at least 650 N/mm$^2$ and no greater than 950 N/mm$^2$.

9. An inkjet recording method comprising:
ejecting a first ink toward a recording medium; and
ejecting a second ink toward at least a part of an area of the recording medium to which the first ink has been ejected, wherein
the first ink contains a first pigment being a kind of a white pigment, a first binder, and a first aqueous medium,
the second ink contains a second pigment being a non-white pigment, a second binder, and a second aqueous medium,
the first binder has a Young's modulus of at least 600 N/mm$^2$ and no greater than 1600 N/mm$^2$,
the second binder has a Young's modulus of at least 350 N/mm$^2$ and no greater than 1600 N/mm$^2$,
the recording medium is a non-absorbent recording medium, and
a difference (EI–E2) between the Young's modulus (E1) of the first binder and the Young's modulus (E2) of the second binder is at least 650 N/mm$^2$ and no greater than 950 N/mm$^2$.

\* \* \* \* \*